(12) United States Patent
Kawamura et al.

(10) Patent No.: US 11,882,479 B2
(45) Date of Patent: Jan. 23, 2024

(54) WIRELESS LAN COMMUNICATION DEVICE AND WIRELESS LAN COMMUNICATION METHOD

(71) Applicant: Nippon Telegraph and Telephone Corporation, Tokyo (JP)

(72) Inventors: Kenichi Kawamura, Tokyo (JP); Yasushi Takatori, Tokyo (JP); Hiroshi Nakamoto, Tokyo (JP); Tomoyuki Yamada, Tokyo (JP); Keisuke Wakao, Tokyo (JP); Shota Nakayama, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 404 days.

(21) Appl. No.: 17/293,349

(22) PCT Filed: Nov. 8, 2019

(86) PCT No.: PCT/JP2019/043848
§ 371 (c)(1),
(2) Date: May 12, 2021

(87) PCT Pub. No.: WO2020/100734
PCT Pub. Date: May 22, 2020

(65) Prior Publication Data
US 2022/0014965 A1    Jan. 13, 2022

(30) Foreign Application Priority Data

Nov. 13, 2018  (JP) ................................. 2018-213121

(51) Int. Cl.
*H04J 3/00* (2006.01)
*H04W 28/04* (2009.01)
(Continued)

(52) U.S. Cl.
CPC ............... *H04W 28/04* (2013.01); *H04L 1/16* (2013.01); *H04W 84/12* (2013.01)

(58) Field of Classification Search
None
See application file for complete search history.

(56) References Cited

U.S. PATENT DOCUMENTS 8,300,563 B2 * 10/2012 Krishnaswamy ..... H04L 1/0003
714/752
8,891,666 B2 * 11/2014 Lee .......................... H04W 4/08
375/295

(Continued)

OTHER PUBLICATIONS

[No Author Listed], "Part 11: Wireless LAN Medium Access Control (MAC) and Physical Layer (PHY) Specifications," IEEE, Aug. 2016, 3,774 pages.

(Continued)

*Primary Examiner* — Sithu Ko
(74) *Attorney, Agent, or Firm* — Fish & Richardson P.C.

(57) ABSTRACT

A wireless LAN communication device generates an MPDU by attaching a MAC header to transmission data, generates an A-MPDU subframe by attaching an MPDU delimiter to the MPDU, generates an A-MPDU by aggregating a plurality of A-MPDU subframes, and transmits the A-MPDU. The wireless LAN communication device includes: an MPDU duplicating means for determining whether or not transmission data is a redundancy target according to a required quality of the transmission data, determining that an MPDU generated from the transmission data determined to be a redundancy target is a redundant MPDU, and generating a duplicate MPDU by duplicating the redundant MPDU; and an A-MPDU generating means for generating an A-MPDU that includes the redundant MPDU and the duplicate MPDU.

6 Claims, 4 Drawing Sheets

(51) Int. Cl.
    *H04L 1/16*     (2023.01)
    *H04W 84/12*     (2009.01)

(56) References Cited

U.S. PATENT DOCUMENTS

| | | | | |
|---|---|---|---|---|
| 8,989,102 | B2* | 3/2015 | Kenney | H04W 52/02 |
| | | | | 370/252 |
| 9,166,746 | B2* | 10/2015 | Bae | H04L 1/1816 |
| 9,203,586 | B2* | 12/2015 | You | H04W 84/12 |
| 11,159,985 | B2* | 10/2021 | Hori | H04W 76/27 |
| 11,196,662 | B2* | 12/2021 | Tang | H04W 16/32 |
| 11,653,387 | B2* | 5/2023 | Agiwal | H04W 76/11 |
| | | | | 370/329 |
| 2015/0036673 | A1* | 2/2015 | Asterjadhi | H04W 28/065 |
| | | | | 370/338 |
| 2023/0156864 | A1* | 5/2023 | Hsu | H04L 5/0064 |
| | | | | 370/329 |
| 2023/0300015 | A1* | 9/2023 | Park | H04L 27/2618 |
| | | | | 370/329 |

OTHER PUBLICATIONS

Heer, "Parallel Redundancy Protocol Notably Improves Industrial Wireless Reliability," Hirschmann, 2015, 4 pages.

* cited by examiner

WIRELESS LAN COMMUNICATION DEVICE AND WIRELESS LAN COMMUNICATION METHOD

CROSS-REFERENCE TO RELATED APPLICATIONS

This application is a National Stage application under 35 U.S.C. § 371 of International Application No. PCT/JP2019/043848, having an International Filing Date of Nov. 8, 2019, which claims priority to Japanese Application Serial No. 2018-213121, filed on Nov. 13, 2018. The disclosure of the prior application is considered part of the disclosure of this application, and is incorporated in its entirety into this application.

TECHNICAL FIELD

The present invention relates to a wireless LAN communication device and a wireless LAN communication method for performing redundant transmission with a single wireless LAN chip (transmitter) configuration.

BACKGROUND ART

Wireless LANs are widely used as wireless access means due to being convenient in terms of having a high bandwidth and being able to be easily installed by anyone. Wireless LANs typically use the 2.4 GHz and 5 GHz frequency bands. Since these frequency bands do not require a license, wireless devices can be installed and used by anyone without applying for a license.

Wireless LAN specifications (NPL 1) have been established by the IEEE, and CSMA/CA (Carrier Sense Multiple Access with Collision Avoidance) is used as the wireless access system. In CSMA/CA, a wireless LAN terminal performs carrier sensing before performing transmission, and checks whether a certain time channel is being used before starting transmission. If the channel is being used, the wireless LAN terminal waits until use of the channel ends, then further waits an additional predetermined time and a randomly selected number of slots, and transmits a wireless frame if the channel is not used during the wait time.

In this way, wireless LAN terminals autonomously avoid collisions when transmitting. A transmitted wireless frame includes a destination address, and if a wireless LAN device that receives a wireless frame is the destination, the wireless LAN device immediately returns an ACK frame after an SIFS (Short Inter Frame Space) period. Accordingly, if a transmitted wireless frame cannot be delivered due to radio interference or the like, an ACK frame is not returned, and thus the transmitter side deems that the wireless frame encountered a transmission error, and performs re-transmission. However, because wireless LANs use bands that do not require a license, and interference occurs often, it is likely for re-transmission to occur frequently, and the completion of data transmission becomes delayed in such cases.

As one example of conventional technology for reducing wireless frame delay, jitter, and packet loss in a wireless LAN system, there is a configuration for providing redundant wireless LAN transmission paths (NPL 2). In this system, multiple wireless LAN transmission paths are prepared, and transmission frames are duplicated and redundantly transmitted on multiple transmission paths. Even if an error occurs on one transmission path, as long as the transmission is successful on another transmission path, delay and packet loss can be mitigated.

CITATION LIST

Non Patent Literature

[NPL 1] IEEE P802.11-REVmcTM/D8.0, August 2016 Draft Standard for Information technology—Telecommunications and information exchange between systems Local and metropolitan area networks—Specific requirements Part 11: Wireless LAN Medium Access Control (MAC) and Physical Layer (PHY) Specifications.

[NPL 2] Dr. Tobias Heer, "Parallel Redundancy Protocol Notably Improves Industrial Wireless Reliability", Belden Inc. White Paper.

SUMMARY OF THE INVENTION

Technical Problem

In order to realize a wireless LAN system that uses redundant transmission on multiple transmission paths in order to reduce wireless frame delay, jitter, and packet loss, it has been necessary to provide multiple wireless LAN chips (transmitters), and it has not been possible to realize such a system with a single wireless LAN chip configuration.

An object of the present invention is to provide a wireless LAN communication device and a wireless LAN communication method that can perform redundant transmission and reduce delay, jitter, and packet loss even with a single wireless LAN chip configuration.

Means for Solving the Problem

A first aspect of the present invention is a wireless LAN communication device that generates an MPDU by attaching a MAC header to transmission data, generates an A-MPDU subframe by attaching an MPDU delimiter to the MPDU, generates an A-MPDU by aggregating a plurality of A-MPDU subframes, and transmits the A-MPDU, the wireless LAN communication device including: MPDU duplicating means for determining whether or not transmission data is a redundancy target according to a required quality of the transmission data, determining that an MPDU generated from the transmission data determined to be a redundancy target is a redundant MPDU, and generating a duplicate MPDU by duplicating the redundant MPDU; and A-MPDU generating means for generating an A-MPDU that includes the redundant MPDU and the duplicate MPDU.

In the wireless LAN communication device according to the first aspect, the A-MPDU generating means may be configured to arrange the redundant MPDU and the duplicate MPDU at distant positions in the A-MPDU.

The wireless LAN communication device according to the first aspect may further include: re-transmission controlling means for performing control such that re-transmission of the redundant MPDU and the duplicate MPDU is not performed if a notification of successful reception of at least either the redundant MPDU or the duplicate MPDU was received from a receiver of the A-MPDU.

A second aspect of the present invention is a wireless LAN communication method of generating an MPDU by attaching a MAC header to transmission data, generating an A-MPDU subframe by attaching an MPDU delimiter to the MPDU, generating an A-MPDU by aggregating a plurality of A-MPDU subframes, and transmitting the A-MPDU, the wireless LAN communication method including: a step 1 of determining whether or not transmission data is a redundancy target according to a required quality of the transmission data, determining that an MPDU generated from the transmission data determined to be a redundancy target is a redundant MPDU, and generating a duplicate MPDU by duplicating the redundant MPDU; and a step 2 of generating an A-MPDU that includes the redundant MPDU and the duplicate MPDU.

In the wireless LAN communication method according to the second aspect, in the step 1, the redundant MPDU and the duplicate MPDU may be arranged at distant positions in the A-MPDU.

The wireless LAN communication method according to the second aspect may further include: a step 3 of performing control such that re-transmission of the redundant MPDU and the duplicate MPDU is not performed if a notification of successful reception of at least either the redundant MPDU or the duplicate MPDU was received from a receiver of the A-MPDU.

Effects of the Invention

According to the present invention, the redundant MPDU and the duplicate MPDU are included in an A-MPDU for transmission, and therefore redundant transmission can be performed using a single transmission path. Accordingly, it is possible to perform redundant transmission and reduce delay, jitter, and packet loss even with a single wireless LAN chip configuration.

DESCRIPTION OF EMBODIMENTS

Figure 1:
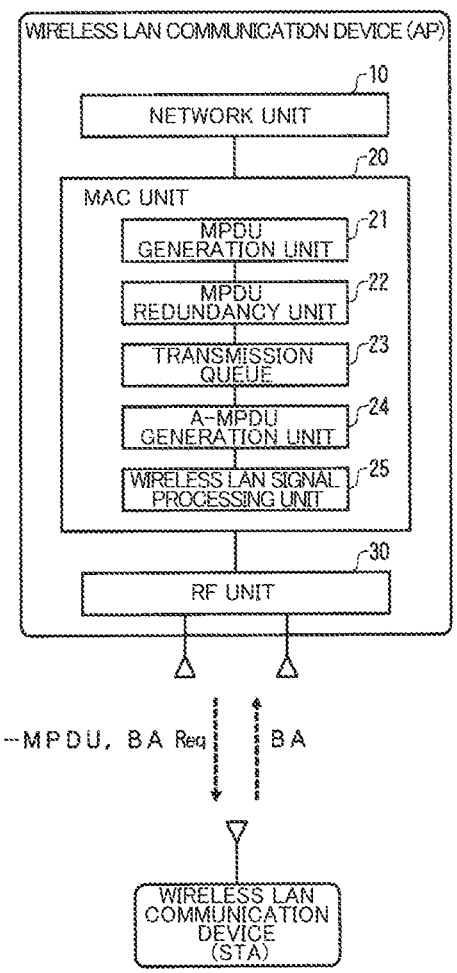
FIG. 1 shows an example of a configuration of a wireless LAN communication device according to the present invention.

FIG. 1 shows an example of the configuration of a wireless LAN communication device according to the present invention. Note that although the wireless LAN communication device may be either a wireless LAN base station (AP: Access Point) or a wireless LAN terminal (STA: Station), the following describes the configuration of a transmission unit of a wireless LAN base station.

In FIG. 1, the wireless LAN communication device includes a network unit 10, a MAC unit 20, and an RF and antenna unit 30. The network unit 10 receives data from a higher network or an application. The MAC unit 20 duplicates data that was received from the network or the application and requires high quality, and performs processing for aggregation in an A-MPDU (Aggregate MAC Protocol Data Unit). The RF and antenna unit 30 performs A-MPDU wireless transmission processing.

The MAC unit 20 is configured as a transmission unit for performing redundant transmission according to the present invention, and includes an MPDU generation unit 21, an MPDU redundancy unit 22, transmission queues 23, an A-MPDU generation unit 24, and a wireless LAN signal processing unit 25.

Note that in a reception unit of the wireless LAN communication device, the A-MPDUs of wireless frames received by the RF and antenna unit 30 are analyzed by the MAC unit 20, processing is performed to output data from the network unit 10 to a higher network or an application, and processing is performed on A-MPDU subframes that were transmitted redundantly.

Figure 2:
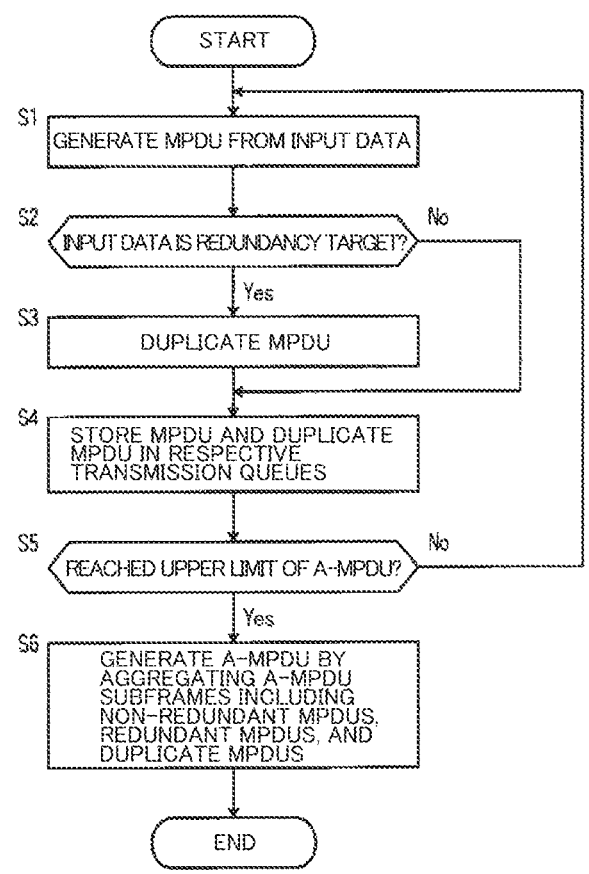
FIG. 2 is a flowchart showing an example of a processing procedure of a MAC unit 20.
Figure 3:
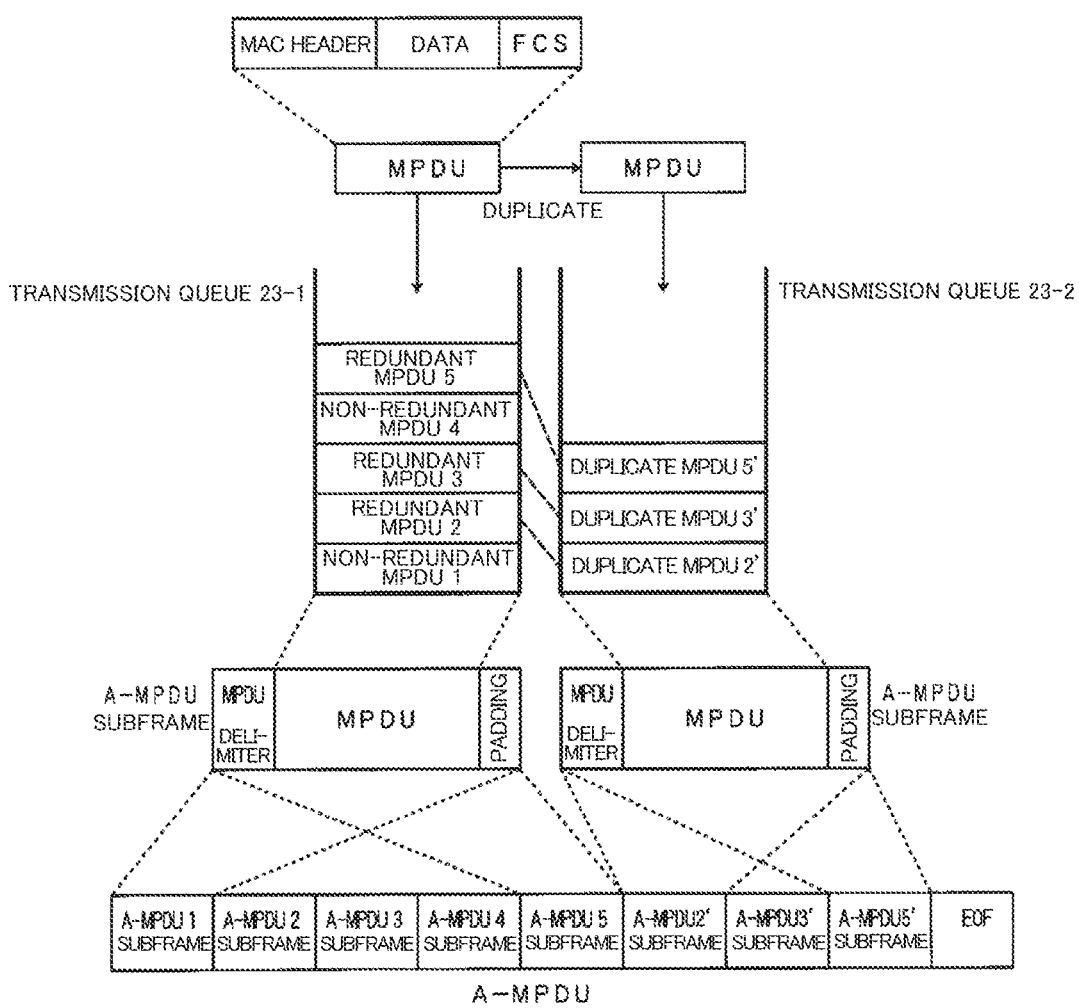
FIG. 3 shows an example of processing performed by the MAC unit 20.

FIG. 2 shows an example of a processing procedure of the MAC unit 20, and FIG. 3 shows an example of processing performed by the MAC unit 20.

In FIGS. 1 to 3, the MPDU generation unit 21 attaches a MAC header to input data to generate an MPDU (S1). The MPDU redundancy unit 22 determines whether or not input data is a redundancy target according to the required quality of the input data (S2), duplicates an MPDU (S3) if the input data has a high required quality and is a redundancy target, and stores non-redundant and redundant MPDUs in one transmission queue 23 and stores a duplicate MPDU in another transmission queue 23 (S4). It is then determined whether or not the total number of MPDUs stored in the transmission queues 23 has reached the upper storage limit of the A-MPDU (S5), and the processing of steps S1 to S4 is repeated until the upper limit of the A-MPDU is reached.

When the number of MPDUs in the transmission queues 23 reaches the upper limit of the A-MPDU, the A-MPDU generation unit 24 adds MPDU delimiters to the non-redundant MPDUs, the redundant MPDUs, and the duplicate MPDUs to generate A-MPDU subframes, and aggregates the A-MPDU subframes to generate an A-MPDU (S6).

The transmission queues 23 shown in FIG. 3 include a transmission queue 23-1 that stores non-redundant MPDUs and redundant MPDUs and a transmission queue 23-2 that stores duplicate MPDUs, and it is assumed that the MPDUs are stored in order.

The A-MPDU generation unit 24 first reads out a non-redundant MPDU 1, redundant MPDUs 2 and 3, a non-redundant MPDU 4, and a redundant MPDU 5 from the beginning of the transmission queue 23-1, generates A-MPDU subframes, and aggregates the subframes in order. Next, the A-MPDU generation unit 24 reads out duplicate MPDUs 2', 3', and 5' from the transmission queue 23-2, generates A-MPDU subframes, aggregates the subframes in order, and generates an A-MPDU. Accordingly, redundant MPDUs and corresponding duplicate MPDUs are arranged at distant positions in the A-MPDU, and even if a transmission error occurs for some A-MPDU subframes due to interference or the like, there is a high possibility that either the redundant MPDU or the corresponding duplicate MPDU will be received successfully.

Note that although one duplicate MPDU is generated in the above description, two or more may be generated, and in this case as well, the duplicate MPDUs are arranged at distant positions. Also, if a redundant MPDU and a corresponding duplicate MPDU are arranged directly next to or close to each other, the A-MPDU may be reassembled such that they are arranged at distant positions.

Figure 4:
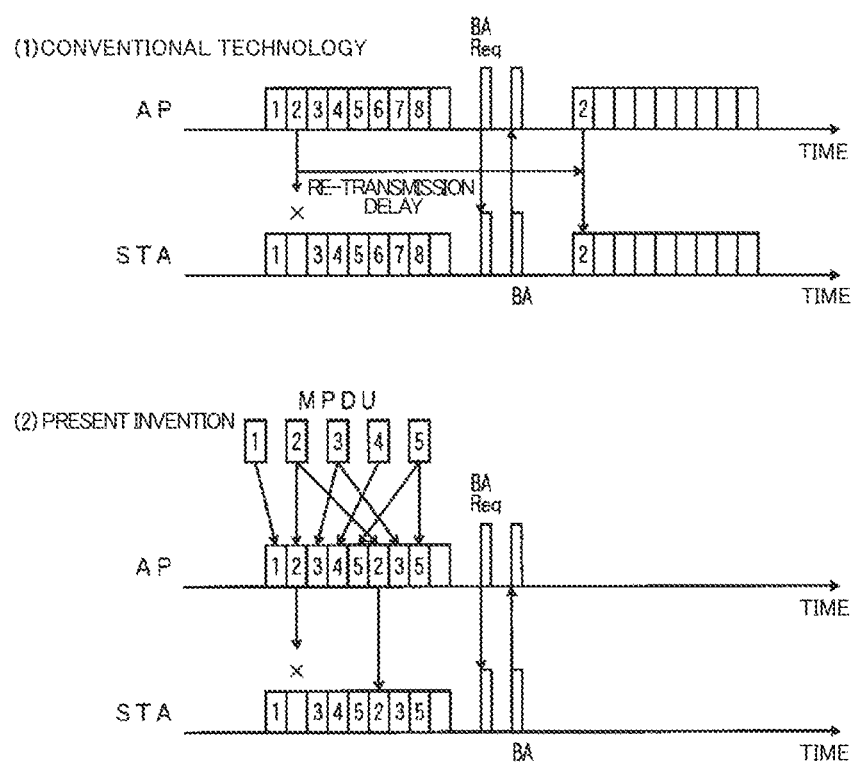
FIG. 4 is a time chart showing an example of A-MPDU transmission operations.

FIG. 4 shows an example of A-MPDU transmission operations.

FIG. 4(1) shows conventional technology, in which if an error occurs with an A-MPDU subframe 2 in the A-MPDU, that A-MPDU subframe 2 is re-transmitted in the next A-MPDU, and therefore a delay occurs due to re-transmission.

FIG. 4(2) shows operations in the present invention, and in this case, MPDUs 2, 3, and 5 shown in FIG. 3 are duplicated, and even if an error occurs with the MPDU 2, transmission ends successfully as long as the corresponding duplicate MPDU 2 is received, and a delay caused by re-transmission is avoided.

Note that A-MPDU transmission is performed using a system that uses a block ACK request (BA Req) from the transmission side and a block ACK (BA) from the reception side in order to confirm delivery of A-MPDU subframes. If either a redundant MPDU or a corresponding duplicate MPDU is transmitted successfully, re-transmission is not necessary, and therefore that redundant MPDU and corresponding duplicate MPDU are deleted from the transmission queues at the same time. On the other hand, if both a redundant MPDU and a corresponding duplicate MPDU are not transmitted successfully, that redundant MPDU and corresponding duplicate MPDU are left in the transmission queues and re-transmitted in the next A-MPDU. Also, a configuration is possible in which if a non-redundant MPDU is not transmitted successfully, it is left in the transmission queue 23-1 as a redundant MPDU, a duplicate MPDU is generated and stored in the transmission queue 23-2, and the MPDUs are re-transmitted in the next A-MPDU.

When the MPDU redundancy unit 22 determines whether or not input data is to be a redundancy target according to the required quality of the input data, the following are examples of parameters referenced regarding the required quality.

Destination MAC address
TOS field, DSCP value (QoS level) in IP header
CoS field (QoS level) in Ethernet (registered trademark) header
Application type or protocol type (DPI-based determination)
Packet size is certain value or lower
Assigned SSID of terminal if multiple Virtual APs have been configured

REFERENCE SIGNS LIST

10 Network unit
20 MAC unit
21 MPDU generation unit
22 MPDU redundancy unit
23 Transmission queue
24 A-MPDU generation unit
25 Wireless LAN signal processing unit
30 RF and antenna unit

The invention claimed is:

1. A wireless LAN (Local Area Network) communication device configured to:
generate an MPDU (MAC Protocol Data Unit) by attaching a MAC header to transmission data, generate an A-MPDU (Aggregate MAC Protocol Data Unit) sub frame by attaching an MPDU delimiter to the MPDU, generate an A-MPDU by aggregating a plurality of A-MPDU subframes, and transmit the A-MPDU, the wireless LAN communication device comprising:
an MPDU redundancy unit, including one or more processors, configured to determine whether or not the transmission data is a redundancy target according to a required quality of the transmission data, determine that the MPDU generated from the transmission data determined to be a redundancy target is a redundant MPDU, and generate a duplicate MPDU by duplicating the redundant MPDU; and
an A-MPDU generation unit, including one or more processors, configured to generate the A-MPDU that includes the redundant MPDU and the duplicate MPDU.

2. The wireless LAN communication device according to claim 1, wherein the A-MPDU generation unit, is configured to arrange the redundant MPDU and the duplicate MPDU at distant positions in the A-MPDU.

3. The wireless LAN communication device according to claim 1, further configured to perform control such that re-transmission of the redundant MPDU and the duplicate MPDU is not performed if a notification of successful reception of at least either the redundant MPDU or the duplicate MPDU was received from a receiver of the A-MPDU.

4. A wireless LAN (Local Area Network) communication method for generating an MPDU (MAC Protocol Data Unit) by attaching a MAC header to transmission data, generating an A-MPDU (Aggregate MAC Protocol Data Unit) subframe by attaching an MPDU delimiter to the MPDU, generating an A-MPDU by aggregating a plurality of A-MPDU subframes, and transmitting the A-MPDU, the wireless LAN communication method comprising:
determining whether or not the transmission data is a redundancy target according to a required quality of the transmission data, determining that the MPDU generated from the transmission data determined to be a redundancy target is a redundant MPDU, and generating a duplicate MPDU by duplicating the redundant MPDU; and
generating the A-MPDU that includes the redundant MPDU and the duplicate MPDU.

5. The wireless LAN communication method according to claim 4, wherein, the redundant MPDU and the duplicate MPDU are arranged at distant positions in the A-MPDU.

6. The wireless LAN communication method according to claim 4, further comprising: performing control such that re-transmission of the redundant MPDU and the duplicate MPDU is not performed if a notification of successful reception of at least either the redundant MPDU or the duplicate MPDU was received from a receiver of the A-MPDU.

* * * * *